(No Model.)
W. M. LEWIS.
HORSE POWER.
No. 493,827. Patented Mar. 21, 1893.
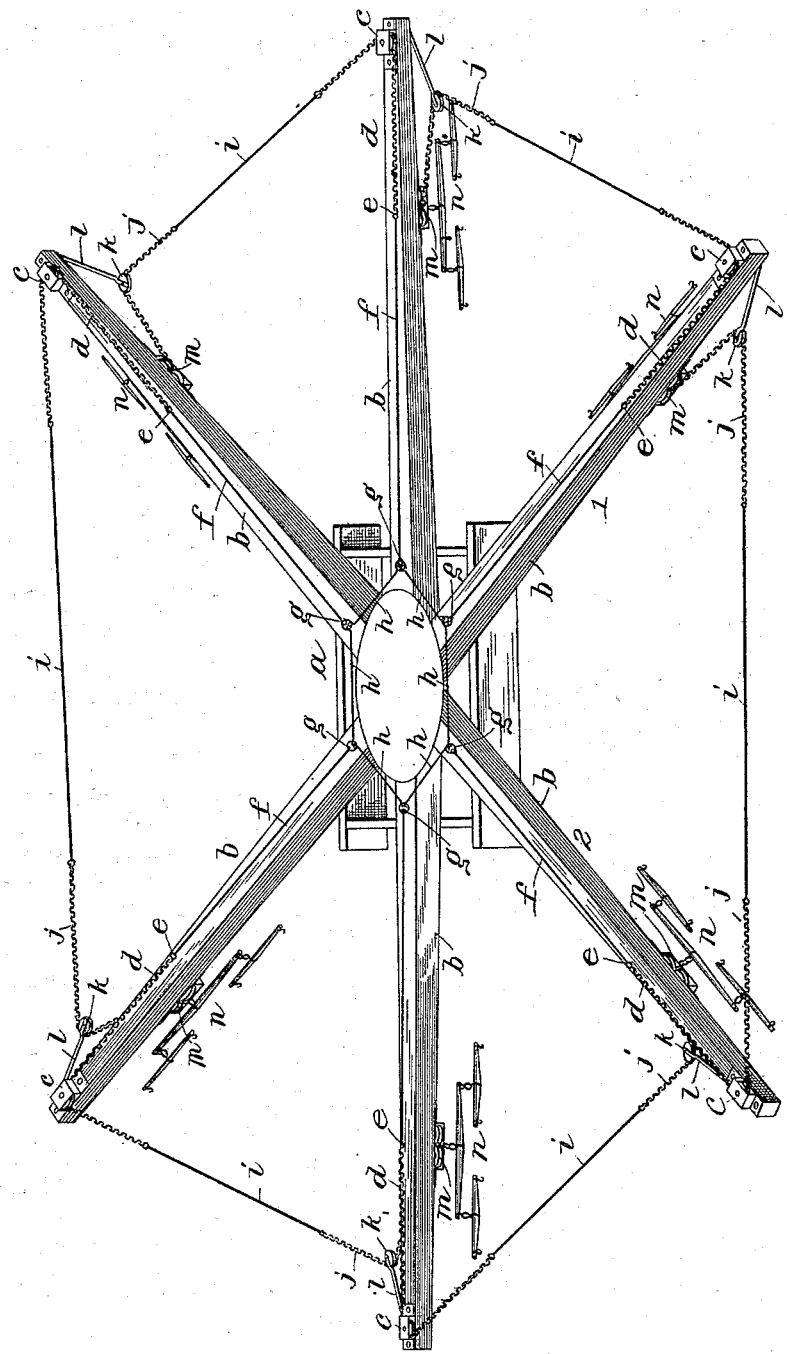

UNITED STATES PATENT OFFICE.

WILLIAM MILO LEWIS, OF NEW HARTFORD, IOWA.

HORSE-POWER.

SPECIFICATION forming part of Letters Patent No. 493,827, dated March 21, 1893.

Application filed November 7, 1892. Serial No. 451,219. (No model.)

*To all whom it may concern:*

Be it known that I, WILLIAM MILO LEWIS, a citizen of the United States, residing at New Hartford, in the county of Butler and State of Iowa, have invented certain new and useful Improvements in Horse-Powers; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention relates to an improvement in horse powers and it has for its object to provide combined means for equalizing the draft of the horses.

To these ends it consists of certain peculiarities of construction and combination of parts that will hereinafter appear and be pointed out in the claims.

Referring to the accompanying drawing which illustrates a perspective view of my invention, the reference letter $a$ indicates the body portion of an ordinary horse power, having as usual, the poles $b$. These poles are increased in length to an extent that will give them the desired leverage and are each provided at their outer ends with a fixed pulley or block $c$. Through these blocks the chains $d$, pass. Attached to one end of each of the chains $d$, at $e$, is a metallic rod $f$, which is provided at its remaining end with a hook $g$, adapted to receive the rings in the ends of the rods $h$. The rods $h$ are of a number equal to that of the poles $b$, and are arranged in the form of a hexagon near the bases of the poles, each of their ends being connected to the ends of the rods $f$, as described. The other ends of the chains $d$, are attached to the second set of rods $i$, which extend across from one pole to another projecting inwardly as they go, so that the chains $j$, which are attached to the ends of rods $i$, will reach the pole on the left about three-quarters of the distance from its base. Each of the chains passes over a pulley K, which is connected by the rod $l$, to the free ends of the poles, and thence between the double pulleys $m$, on the under sides of the poles, to the whiffle-trees $n$. To these whiffle-trees, the horses are, as usual, hitched.

Having thus described my invention, what I claim is—

1. In a horse power, the combination with the poles, of a pulley attached to the free end of each, a second set of pulleys connected by a swing rod to the free ends of said poles, and chains passing over the pulleys and arranged so that one of their ends will be connected to the ends of the others and each of the remaining ends to a whiffle tree, all substantially as described.

2. In a horse power, the combination with its poles of the pulleys $c$ and $m$, the pulleys $k$, rods $l$, connected to the pulleys $k$, and a series of chains passing over the pulleys and arranged with one of their ends connected with each of the others, and their remaining ends to a similar number of whiffle-trees, all substantially as described.

In testimony whereof I affix my signature in presence of two witnesses.

WILLIAM MILO LEWIS.

Witnesses:
C. R. HARMON,
O. A. CRITZMAN.